(12) United States Patent
Weiss

(10) Patent No.: US 8,191,578 B2
(45) Date of Patent: Jun. 5, 2012

(54) ROTARY DISC VALVE

(75) Inventor: Aharon Weiss, Misgav (IL)

(73) Assignee: MEGO AFEK AC Ltd., Doar Afek (IL)

( * ) Notice: Subject to any disclaimer, the term of this patent is extended or adjusted under 35 U.S.C. 154(b) by 1059 days.

(21) Appl. No.: 12/149,957

(22) Filed: May 12, 2008

(65) Prior Publication Data

US 2009/0120520 A1 May 14, 2009

Related U.S. Application Data

(60) Provisional application No. 60/996,328, filed on Nov. 13, 2007.

(51) Int. Cl.
*F16K 11/078* (2006.01)
(52) U.S. Cl. ......... 137/625.17; 137/625.15; 137/625.21; 137/625.46
(58) Field of Classification Search ............. 137/625.15, 137/625.17, 625.21, 625.46, 625.23
See application file for complete search history.

(56) References Cited

U.S. PATENT DOCUMENTS

| | | | | |
|---|---|---|---|---|
| 3,542,071 | A | * | 11/1970 | Debbrecht et al. ....... 137/625.46 |
| 4,614,205 | A | | 9/1986 | Oroskar |
| 5,014,681 | A | * | 5/1991 | Heeman et al. ............. 601/152 |
| 5,676,639 | A | * | 10/1997 | Schild ........................ 601/151 |
| 6,152,176 | A | | 11/2000 | Lin |
| 6,779,557 | B2 | | 8/2004 | Weiss |
| 6,789,573 | B2 | * | 9/2004 | Knapp ..................... 137/625.15 |
| 7,866,344 | B2 | * | 1/2011 | Webster et al. .......... 137/625.21 |
| 2004/0094216 | A1 | * | 5/2004 | Wagner .................... 137/625.46 |

FOREIGN PATENT DOCUMENTS

| | | |
|---|---|---|
| FR | 1368713 | 8/1964 |
| JP | 1-145474 | 6/1989 |

OTHER PUBLICATIONS

European Search Report, EPO Form 1503 03.82, EP 08 00 8902, search completed on Nov. 29, 2010.

* cited by examiner

*Primary Examiner* — Craig Schneider
*Assistant Examiner* — Jessica Cahill
(74) *Attorney, Agent, or Firm* — The Nath Law Group; Joshua B. Goldberg

(57) ABSTRACT

A multi-port rotary disc valve adapted to allow fluid flow from at least one fluid source to a plurality of destinations, comprises a stator with fluid flow ports including a plurality of individual ports and at least one common port. Each of the individual ports is adapted for fluid communication with at least one of the destinations, and the one common port is adapted for fluid communication with the source. The individual ports are arranged in spaced apart relationship within an individual ports' stator sector having a stator sector angular length. The valve further comprises a rotor having at least a first, a second and a third rotor sector with channels arranged therein, being opened to the atmosphere or adapted to connect the fluid flow ports of the stator between them in a plurality of predetermined combinations. The first, second and third rotor sectors have a first, second and third rotor sector angular length, respectively, wherein the first and the second rotor sectors are spaced from each other and their angular length is at least equal to said stator sector angular length. The third rotor sector is located at least partially between the first and second rotor sectors.

11 Claims, 15 Drawing Sheets

ROTARY DISC VALVE

This application claims the benefit of prior U.S. provisional patent application No. 60/996,328 filed Nov. 13, 2007, the contents of which are hereby incorporated by reference in their entirety

FIELD OF THE INVENTION

This invention relates to rotary disc valves for feeding fluid flow and/or pressure to a plurality of ports, in particular to valves performing a predetermined cycle of feeding operations, such as, for example, numerous cyclical inflating and deflating a plurality of pressure cells in an inflatable device.

BACKGROUND OF THE INVENTION

A rotary disc valve for inflating and deflating pressure cells in a therapeutic sleeve is disclosed in U.S. Pat. No. 6,779,557, incorporated herein by reference. This rotary disc valve comprises a stator with a plurality of fluid flow ports and a rotary distributor with a plurality of channels arranged in a channel pattern. The channels are adapted to connect the ports between them and/or to the environment in a plurality of predetermined combinations, each combination being associated with an angular position of the rotary distributor with respect to the stator. The succession of combinations performed during a full or partial unidirectional turn of the rotary distributor constitute a predetermined sequence. The rotary distributor comprises a rotor and a mask mounted movably thereon, the rotor and the mask accommodating the plurality of channels. The mask is adapted to change the channel pattern by changing its position with respect to the rotor, thereby enabling the rotary disc valve to perform different predetermined sequences corresponding to different positions of the mask.

JP 01145474 discloses a rotary disc valve with a similar function where the stator comprises two discs fixed with respect to each other, the stator discs slidingly contacting a rotor distributor disc disposed therebetween. The rotor disc has U-channels and through holes connecting the ports of the stator in various combinations during one turn of the rotor distributor disc.

U.S. Pat. No. 4,614,205 discloses a multiport rotary disc valve with a similar function of simultaneous interconnection of a plurality of conduits in accordance with a predetermined cycle. The stator and the rotary distributor in this rotary valve are assemblies each comprised of two parallel plates or discs. The rotary assembly is sandwiched between two parallel plates of the stator assembly. Crossover pipes extend between the rotor plates to form either U-channels or through-passages similar to the above-cited designs.

SUMMARY OF THE INVENTION

In accordance with one aspect of the present invention, there is provided a multi-port rotary disc valve adapted to allow fluid flow from at least one fluid source to a plurality of destinations, said valve comprising:
  a stator with fluid flow ports including a plurality of individual ports and at least one common port; each of said individual ports being adapted for fluid communication with at least one of said destinations, and said one common port being adapted for fluid communication with said source; said individual ports being arranged in spaced apart relationship within an individual ports' stator sector having a stator sector angular length; and
  a rotor having at least a first, a second and a third rotor sector with channels arranged therein, being opened to the atmosphere or adapted to connect the fluid flow ports of the stator between them in a plurality of predetermined combinations, each combination being associated with an angular position of the rotor with respect to the stator during at least partial clock-wise or anti clock-wise turn of the rotor in different predetermined sequences of said combinations, the first, second and third rotor sectors having a first, second and third rotor sector angular length, respectively, wherein the first and the second rotor sectors are spaced from each other and their angular length is at least equal to said stator sector angular length, and said third rotor sector is located at least partially between the first and second rotor sectors.

In accordance with another aspect of the present invention, there is provided multi-port rotary disc valve adapted to allow fluid flow from at least one fluid source to a plurality of destinations in at least two operation modes, said valve comprising:
  a stator with fluid flow ports including a plurality of individual ports and at least one common port; each of said individual ports being adapted for fluid communication with at least one of said destinations, and said one common port being adapted for fluid communication with said source; said individual ports being arranged in spaced apart relationship within an individual ports' stator sector having a stator sector angular length; and
  a rotor having at least a first, a second and a third rotor sector with channels arranged therein, being opened to the atmosphere or adapted to connect the fluid flow ports of the stator between them in a plurality of predetermined combinations, each combination being associated with an angular position of the rotor with respect to the stator during at least partial clock-wise or anti clock-wise turn of the rotor in different predetermined sequences of said combination, said first rotor sector comprising a main outlet connecting channel extending along the entire length thereof and has a first sector angular length at least equal to said stator sector angular length, said second rotor sector comprising an inlet connecting channel for operating in one of said modes, said third rotor sector comprising an inlet connecting channel for operating in the other of said modes, each of the inlet channels having a side portion for connecting between said individual ports of the stator and said inlet channels of the rotor, said side portions being disposed on two sides of said first rotor sector and spaced therefrom.

The stator may have at least one common inlet port, said port being located in said stator sector, and at least one common outlet port.

According to the first aspect described above, the first rotor sector, may comprise a main outlet channel and said second rotor sector comprises a main inlet channel, the main outlet and inlet channels extending along the entire length of their corresponding sectors. The third rotor sector may comprise an additional inlet channel and an additional outlet channel, said additional outlet channel extending along the entire length of said third rotor sector. The valve, may be further adapted for operation in a mode in which the individual channels are sequentially provided with fluid communication with said common inlet port of the stator, and subsequently are connected simultaneously to said common outlet port of the stator. In addition, the valve may be adapted for operation in a mode in which the individual channels are successively provided with fluid communication with said inlet port of the stator, and subsequently are connected successively to other individual channels or to said main outlet port of the stator.

According to the second aspect described above, the stator may have a first inlet common port within said stator sector and a second inlet common port outside said stator sector, said first inlet common port extending along the entire angular length of said stator sector. The stator may further have a main common outlet port and at least one additional outlet port. The third rotor third rotor sector may comprise a pre-inflation outlet and a pre-inflation inlet, so that said inlet channel portion located therebetween, said pre-inflation outlet and inlet being adapted to connect between said individual ports. The valve may be adapted for operation in a mode in which said inlet channel portion located within said second rotor sector sequentially provides the individual channels with fluid communication with said first or second inlet common port of the stator, and subsequently said main outlet channel simultaneously connects the individual channels to said common outlet port of the stator. In addition, the valve may be adapted for operation in a mode in which said inlet channel portion located within said third rotor sector sequentially provides the individual channels with fluid communication with said first or second inlet common port of the stator, said pre-inflation outlet and inlet provide fluid communication between the individual channels, and subsequently said main outlet channel successively connects the individual channels to said main common outlet port or said additional outlet port.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
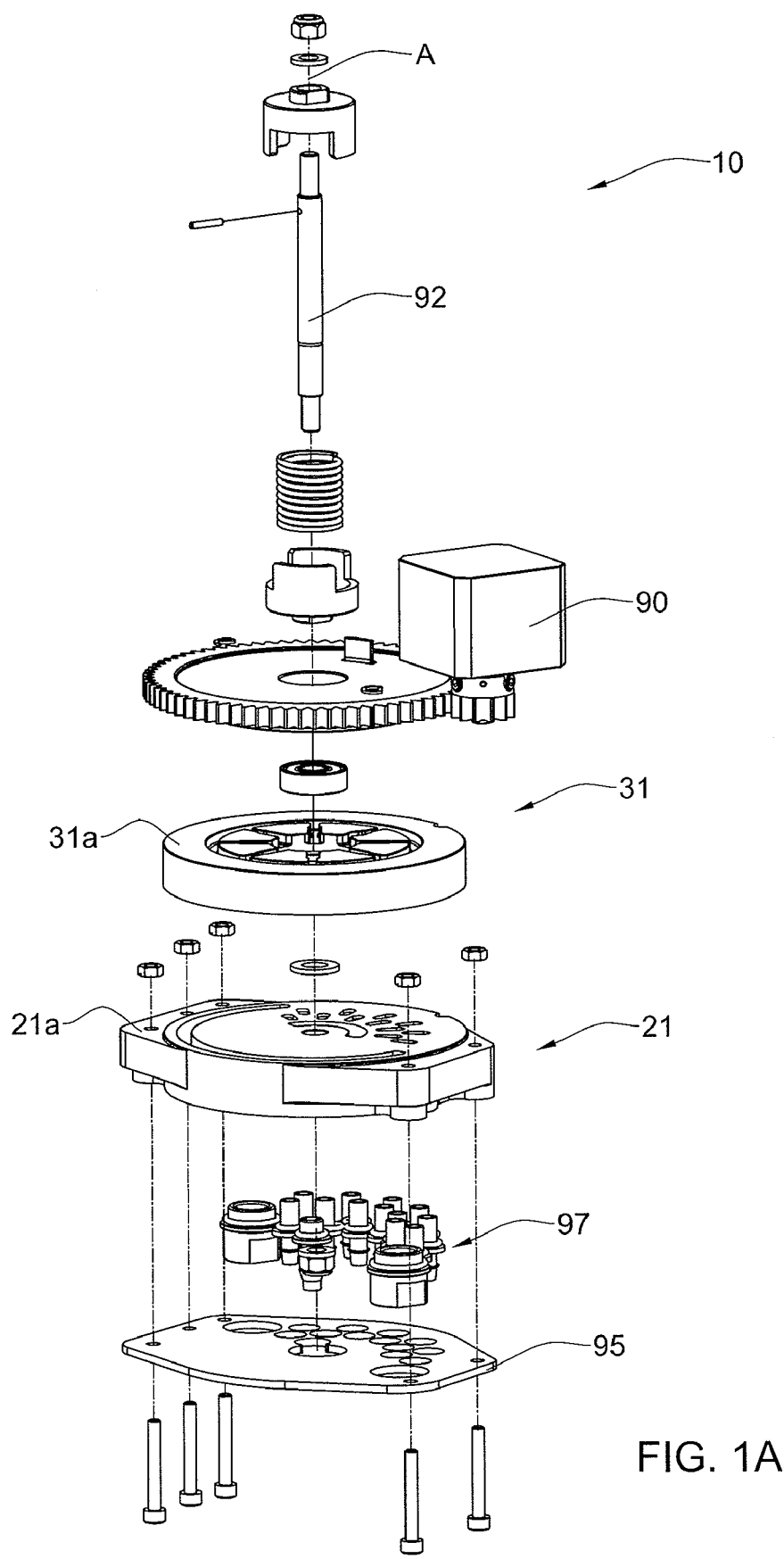
FIG. 1A is an exploded view of a rotary disc valve according to the present invention.
Figure 1B:
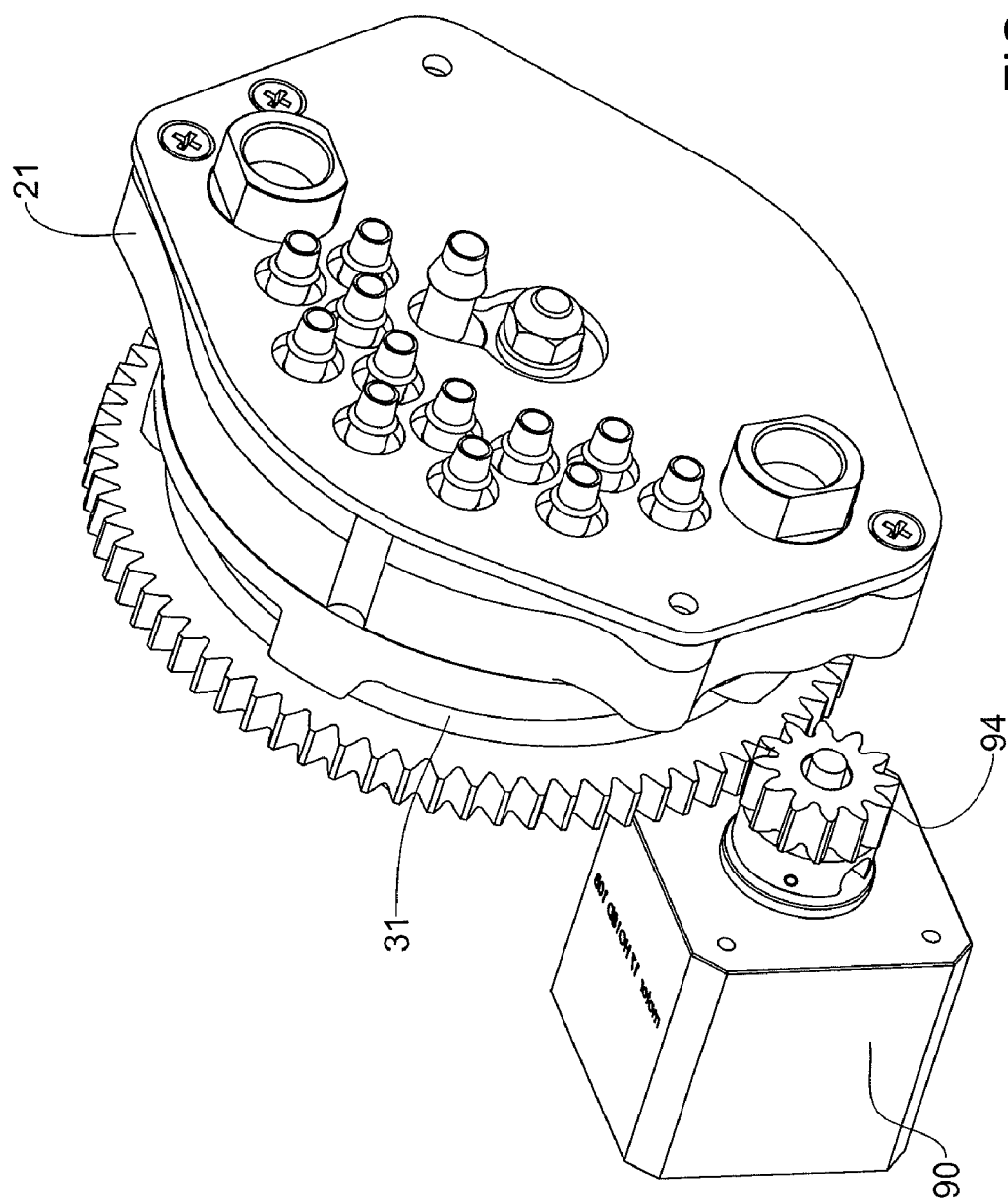
FIGS. 1B and 1C are, respectively, upper and lower isometric views of the assembled rotary disc valve shown in FIG. 1A.
Figure 1C:
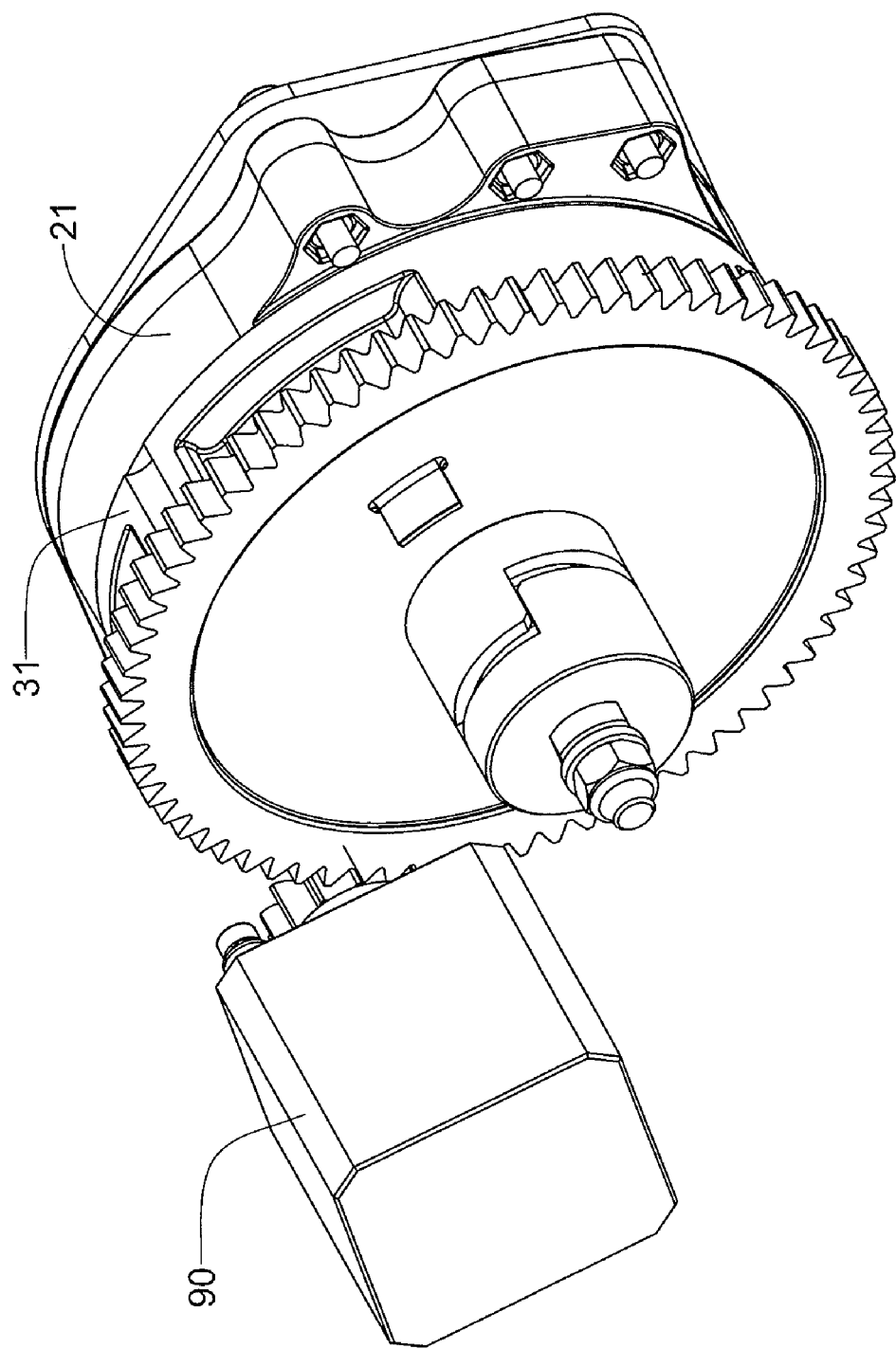

FIGS. 1A to 1C show a multi-port rotary disc valve 10 according to one example of the present invention is shown, which may be used in any application where fluid flow needs to be directed from at least one fluid source to a plurality of destinations in predetermined combinations and sequences of such combinations. One such application may be the use of the valve with an inflatable device having a plurality of pressure cells. For the purpose of explanations and without any limitation to the scope of the invention, the device may be, for example, a therapeutic massage sleeve with N annular cells adapted for embracing a human's limb as described in the U.S. Pat. No. 6,779,557, whose description is incorporated herein by reference.

The disc valve 10 comprises three main components: a stator disc 21, a rotor disc 31 adapted for coaxial assembly along axis A of the valve 10, and a motor 90. The rotor disc 31 being rotatable relative to the stator disc 21 in both clockwise and counterclockwise directions by the motor 90.

Figure 2A:
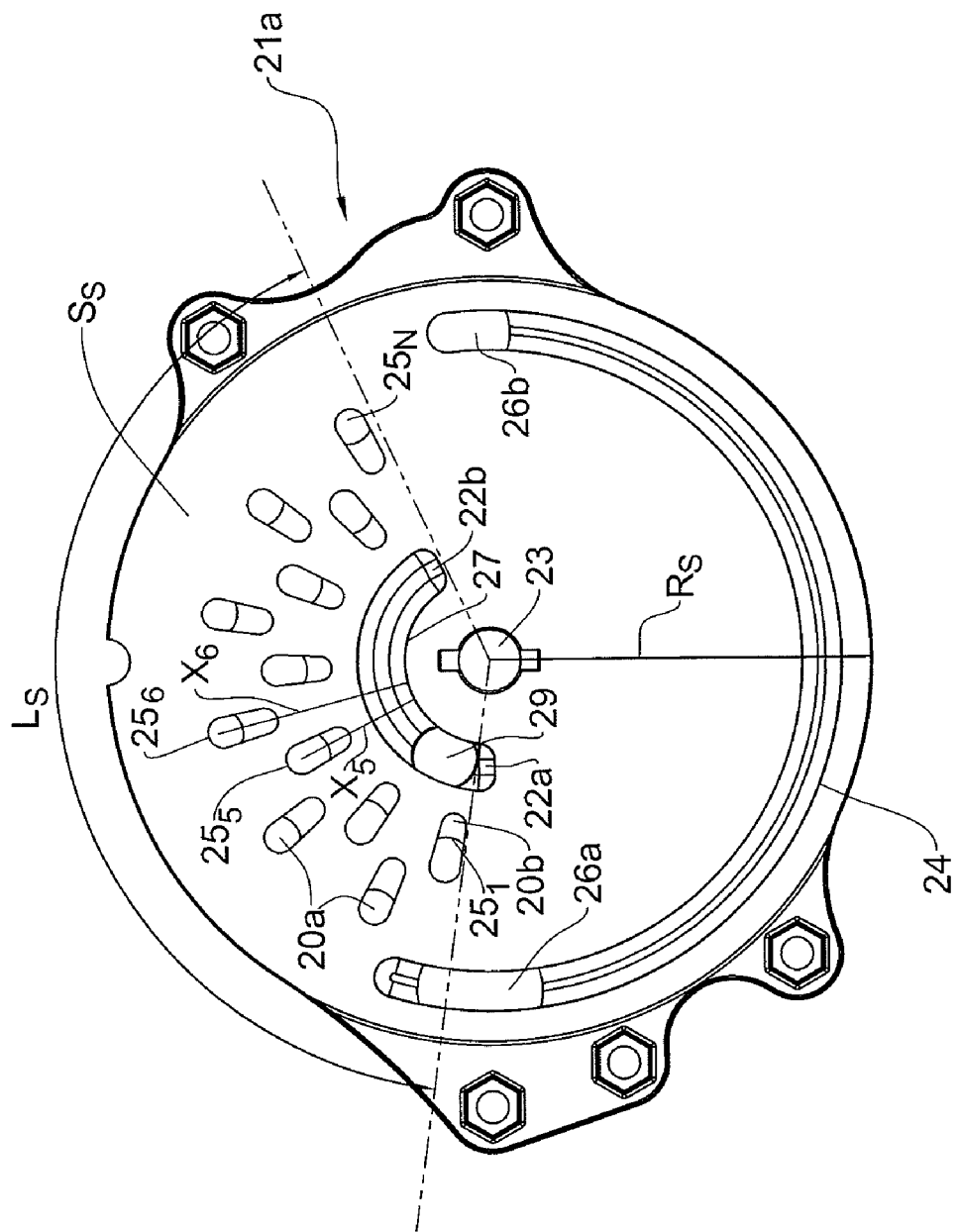
FIGS. 2A and 2B are, respectively, upper and lower views of a stator according to one example of the present invention.
Figure 2B:
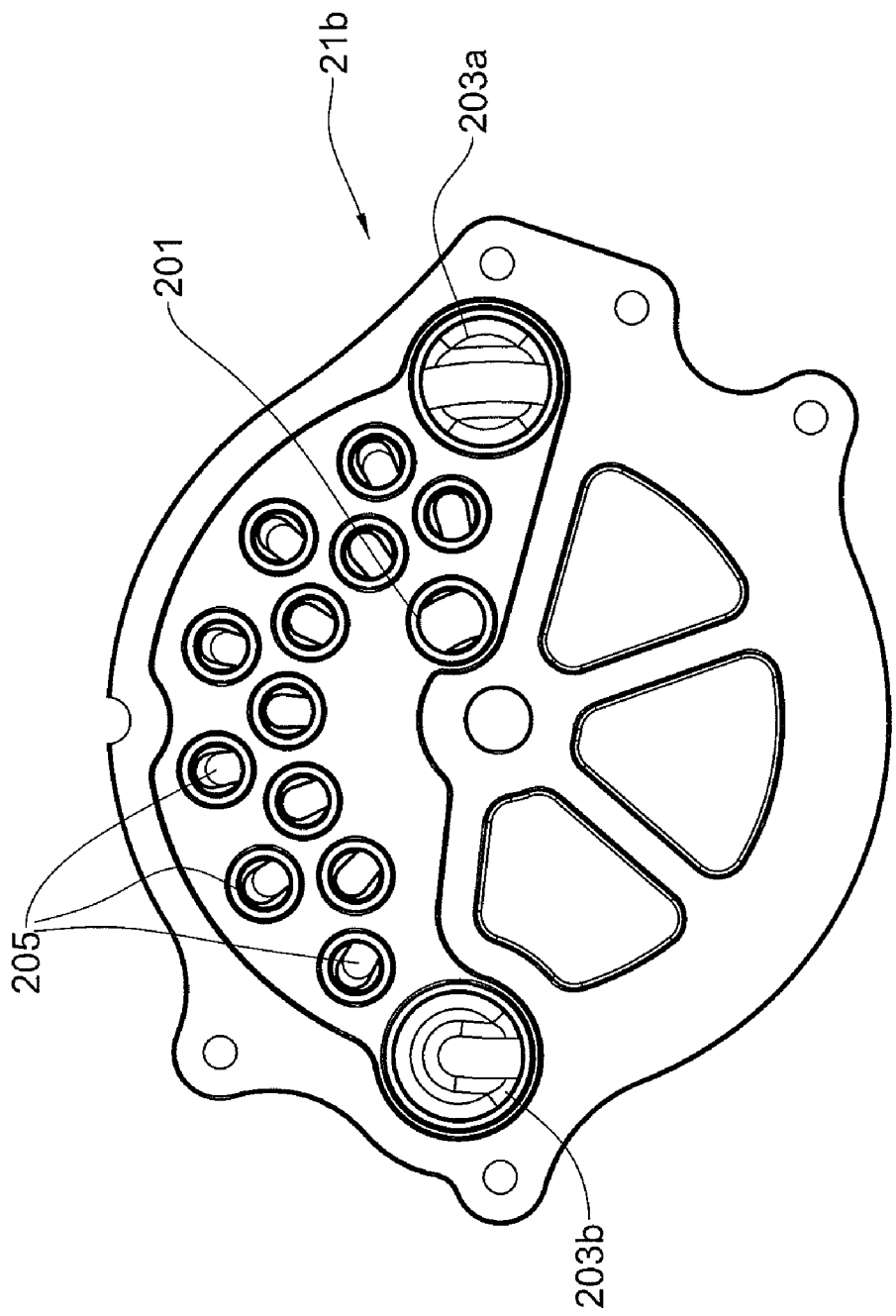

With reference to FIGS. 2A and 2B, the stator disc 21 has a first surface 21a and a second surface 21b (FIG. 2B), and a radius $R_S$. The stator disc 21 is formed with an axial opening 23 for a metal axle 92 (FIG. 1A) as will be further explained and a plurality of fluid flow ports, namely, N individual ports 25, a common inlet port 27 and a common outlet port 24.

The N individual ports 25 are arranged in the stator disc 21 within a stator sector $S_S$ in staggered rows a fan-like manner, being angularly and radially spaced from each other. The sector $S_S$ has a total angular length $L_s$ measured between a first individual port $25_1$ and a last individual port $25_N$, which is less than 180°. The individual ports 25 are characterized by individual radial distances x measured therefrom to the common inlet port 27. The distances may not be equal, for example, the distance $x_5$ of the individual port $25_5$ is smaller than the distance $x_6$ of the individual port $25_6$.

Each individual port 25 has a throughgoing individual port aperture 20a extending between the first and the second surfaces 21a and 21b of the stator disc 21, and a recess 20b formed on the first surface to provide an entrance to the aperture 20a.

The common inlet port 27 has a first channel end 22a and a second channel end 22b and disposed between the individual channels 25 and the axial opening 23, extending around the latter. The common inlet port 27 further comprises a throughgoing inlet aperture 29 adjacent to the first end 22a thereof and extending between the first surface 21a and the second surface 21b of the stator disc 21. The inlet aperture 29 is adapted to connect inlet port 27 to a fluid source. The common outlet port 24 has outlet apertures 26a and 26b. The outlet apertures 26a and 26b are adapted to connect the outlet common port 24 to the atmosphere.

As shown in FIG. 2B, the second face 21b of the stator 21 an air inlet 201, which is an opposite end of the inlet aperture 29, connected to an air source (not shown) and two deflation outlets 203a (outlet aperture 26a) and 203b (outlet aperture 26b) connected to an atmosphere in cases where passive deflation is performed or to a vacuum source (not shown) when active deflation is performed. There are also shown the opposite ends 205 of the apertures 20a of the individual ports 25.

Figure 3A:
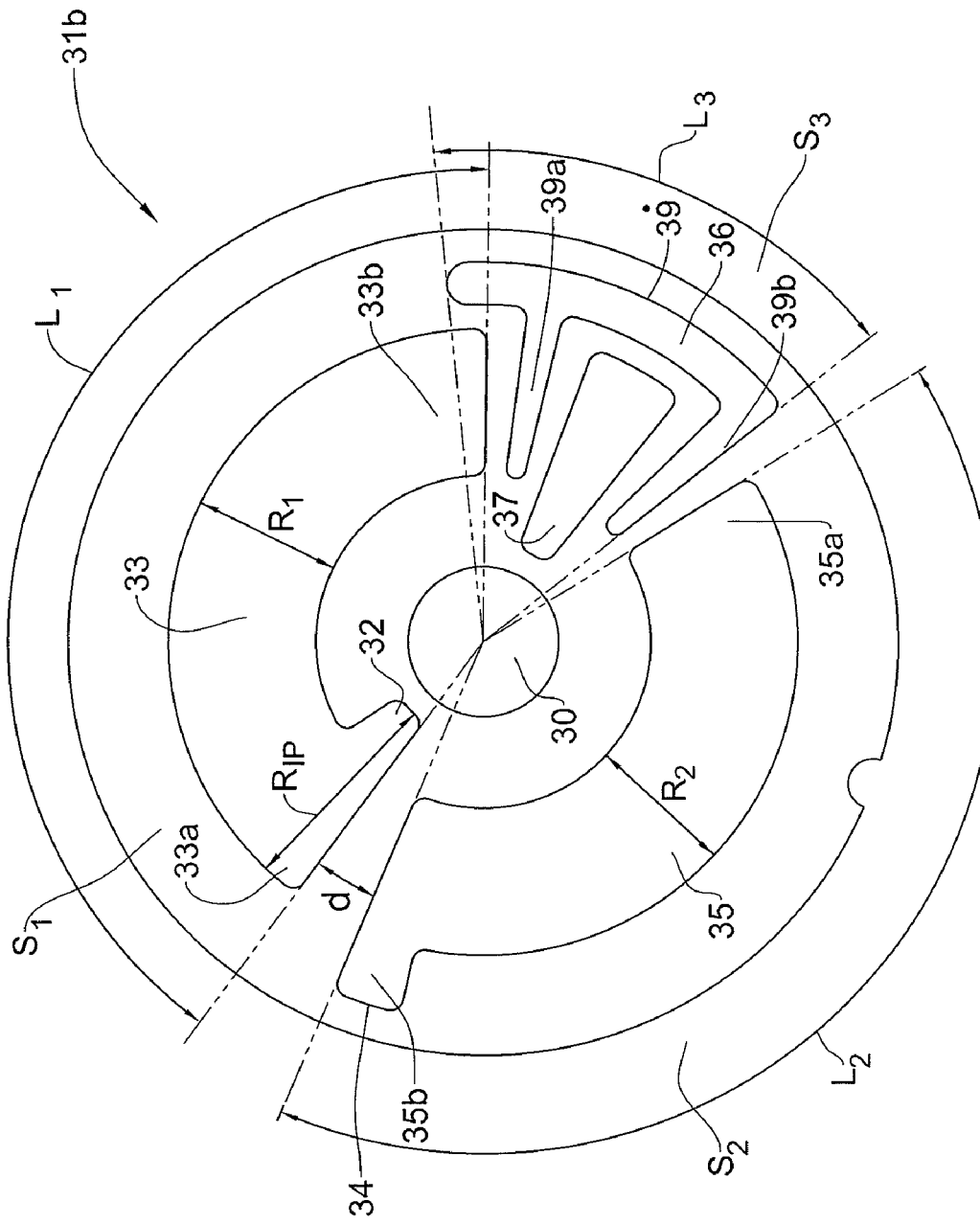
FIG. 3A is a lower view of a rotor according to one example of the present invention.
Figure 3B:
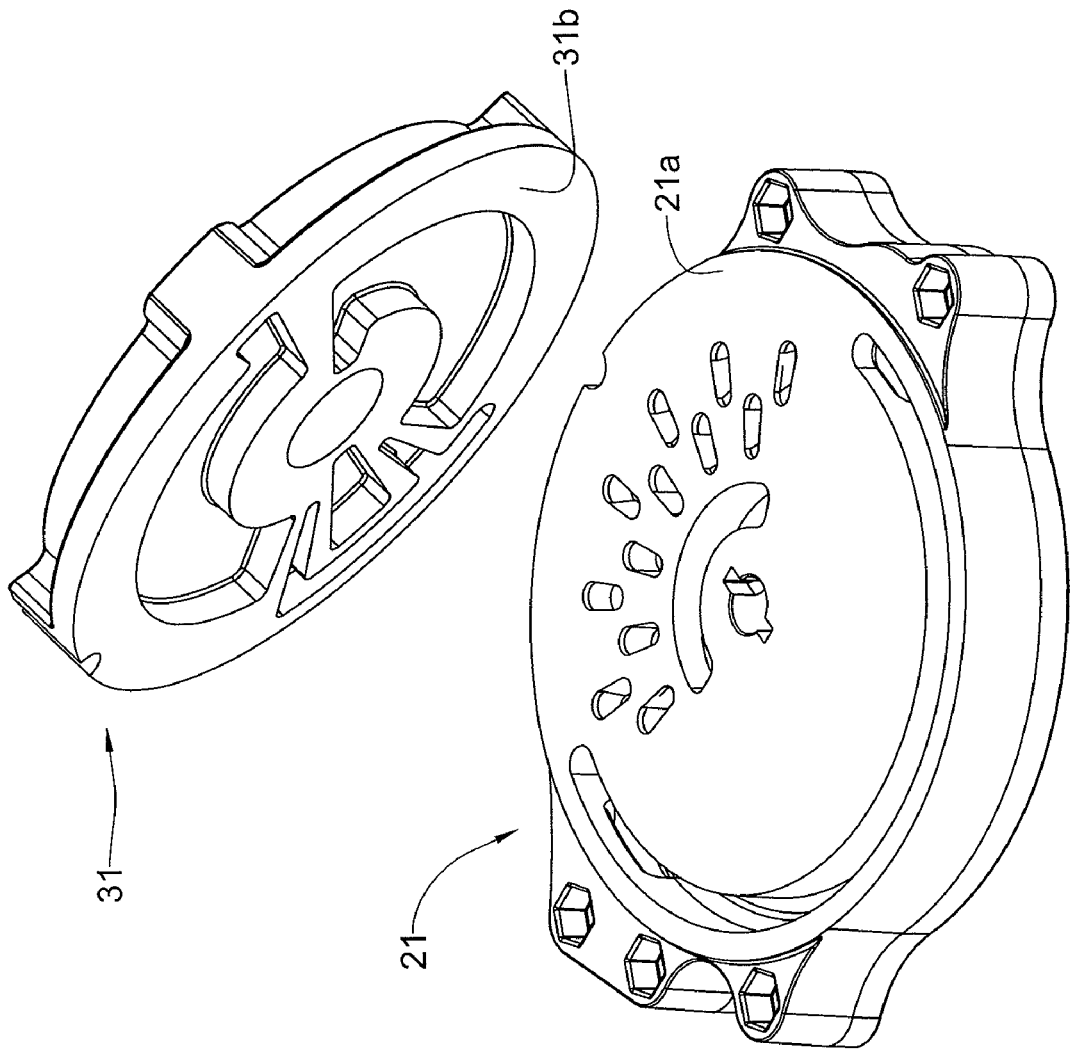
FIG. 3B is an isometric view of the stator and the rotor shown in FIGS. 2A to 3A.

With reference to FIG. 3A, the rotor disc 31 has a second surface 31b (FIG. 3B) and a first surface 31a (1A), an axial opening 30, rotor sectors $S_1$ and $S_2$, spaced by a distance d (d≧0) from each other, and a rotor sector $S_3$ situated mostly between the rotor sectors $S_1$ and $S_2$. The sector $S_3$ may be fully disposed between the rotor sectors $S_1$ and $S_2$ or it may overlap with one or both of them to a desired extent.

The rotor disc 31 is adapted for being rotatably mounted on the stator 21, and all its sectors $S_1$, $S_2$ and $S_3$ have channels in the form of recesses in the first surface 31a of the rotor, adapted to connect fluid flow ports of the stator between them in a plurality of predetermined combinations during at least partial clock-wise or anti clock-wise turn of the rotor, each combination being associated with an angular position of the rotor with respect to the stator.

In particular, the rotor sector $S_1$ comprises a main inlet channel 33 defining angular length $L_1$ of the sector $S_1$ between its first end 33a and second end 33b. The radial dimension $R_1$ of the channel 33 remains equal along the entire length of the channel, except for an inlet portion 32 at the channel's first end 33a terminating about half a distance between the remainder of the channel 33 and the axial opening 30 of the rotor 31. The inlet portion 32 has a radial dimension $R_{IP}$ which is at least equal to the maximal of the individual radial distances x of the individual ports 25 of the stator 21.

The rotor sector $S_2$ comprises a main outlet channel 35 defining angular length $L_2$ of the sector $S_2$ between its first end 35a and its second end 35b. The radial dimension $R_2$ of the channel 35 remains equal along the entire length of the channel, except for an outlet portion 34 at the channel's second end 33b terminating about half a distance between the remainder of the channel 35 and the circumference of the rotor 31.

The angular lengths $L_1$ and $L_2$ of the rotor sectors $S_1$ and $S_2$ are at least equal to the angular length $L_s$ of the stator sector $S_S$.

The rotor sector $S_3$ comprises a centrally located, additional inlet channel 37 extending essentially in the radial direction of the sector $S_3$, and an additional outlet channel 39 having two radially extending lateral portions 39a and 39b disposed on two sides of the central channel 37, and a peripheral portion 36 extending between the lateral portions 39a and 39b, the latter portion defining angular length $L_3$ of the rotor sector $S_3$.

Reverting to FIGS. 1A to 1C, the stator 21 and the rotor 31 are assembled on the metal axle 92. On the rotor distal side 21b there is a plastic gear for transmitting rotation from the motor 90 to the rotor 31. The plastic gear 94 is compressed toward the stator by a compression spring (not shown), which is adapted t produce sealing force between the stator 21 and the rotor 31, thereby avoiding air leakage.

The valve 10 further comprises a stator lower plate 95, connected to the stator 21 and adapted for passing therethrough of fittings 97 connected to ports, inlet and outlet channels of the stator 21.

In operation, the individual ports 25 of the stator 21 are connected by pipes to the inflatable cells of the massage sleeve mentioned above (not shown), and the rotor is brought into positions allowing the channels 33, 35, 37 and 39 thereof to connect the individual ports 25 between themselves and/or with the common ports 27 and 24 of the stator 21 in a plurality of predetermined combinations, each combination being associated with an angular position of the rotor 31 with respect to the stator 21 during full or partial turn of the rotor in direction $B_1$ or $B_2$ in different predetermined sequence of these combinations.

Figure 4A:
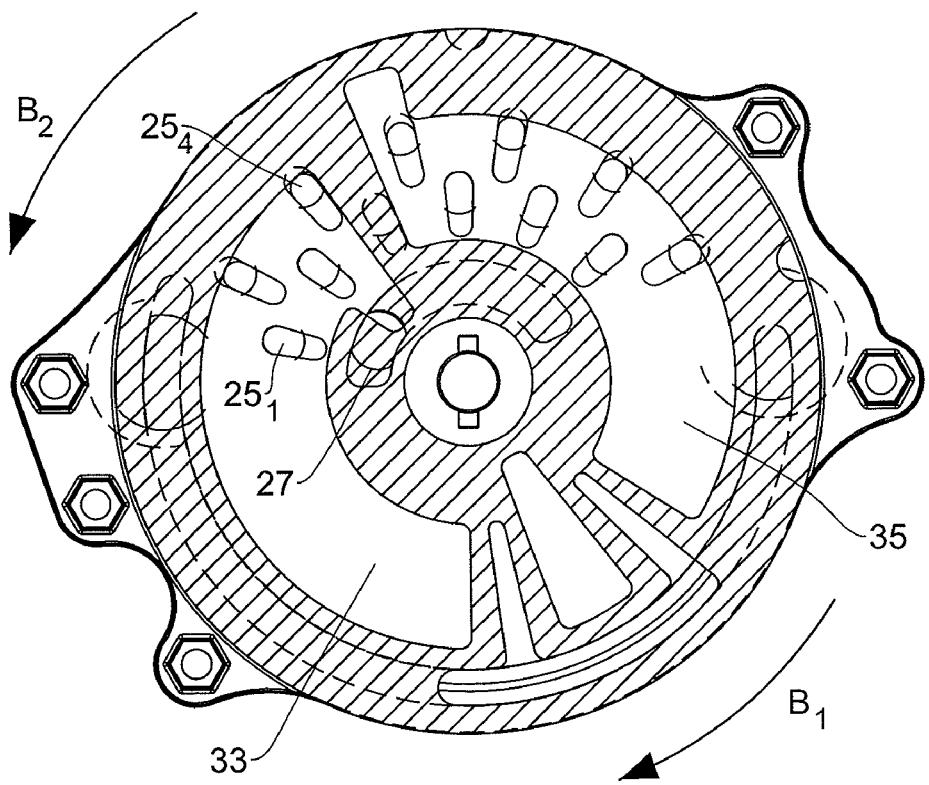
FIGS. 4A to 4C schematically illustrate a build-up sequence performed by the stator and the rotor shown in FIGS. 2A to 3B.
Figure 4B:
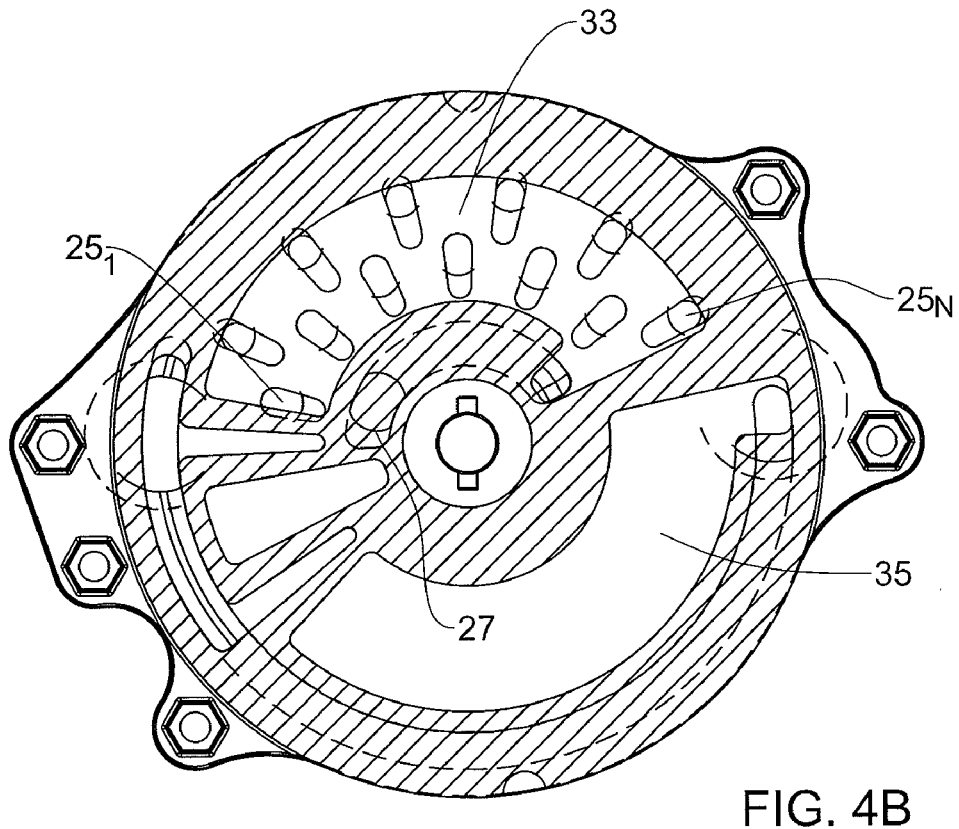
Figure 4C:
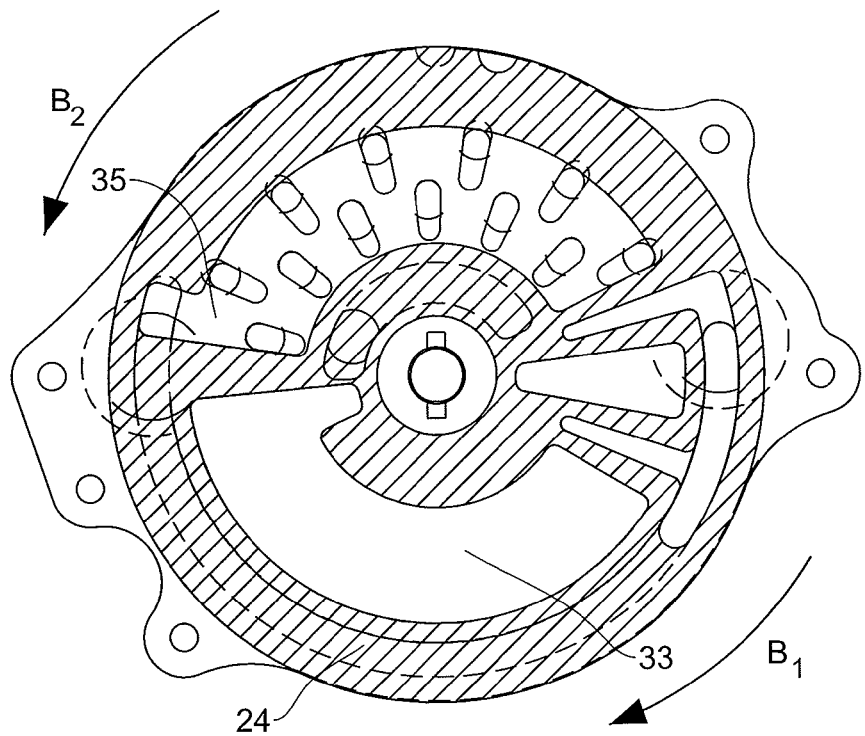
Figure 5A:
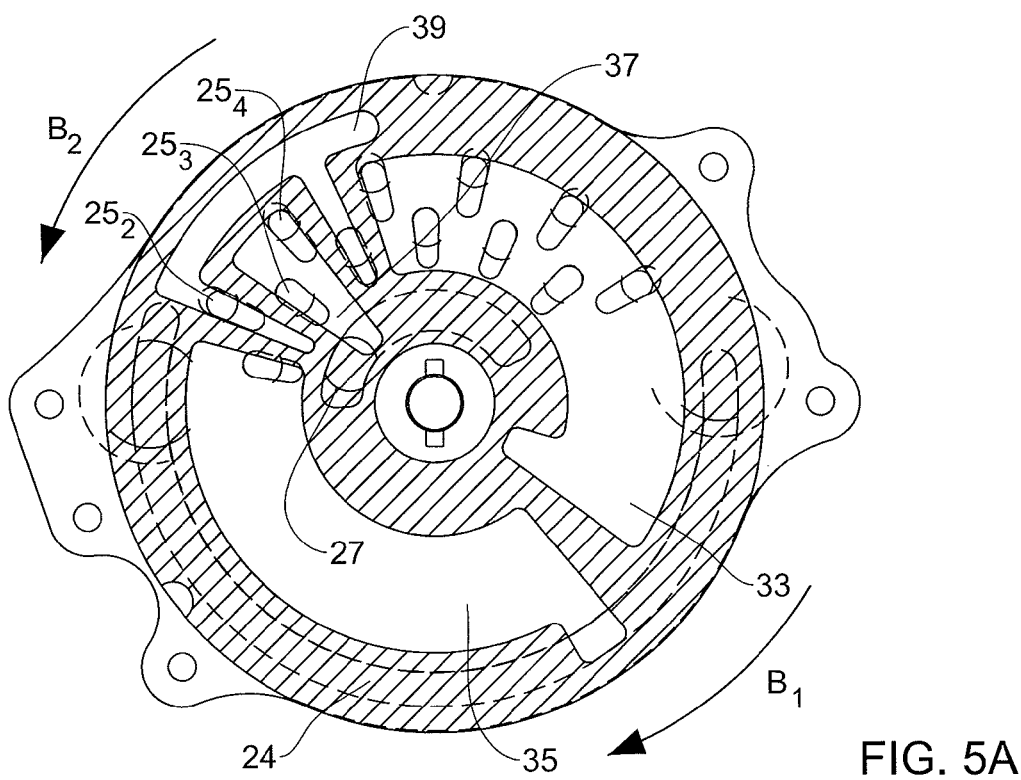
FIGS. 5A and 5B schematically illustrate a wave sequence performed by the stator and the rotor shown in FIGS. 2A to 3B.
Figure 5B:
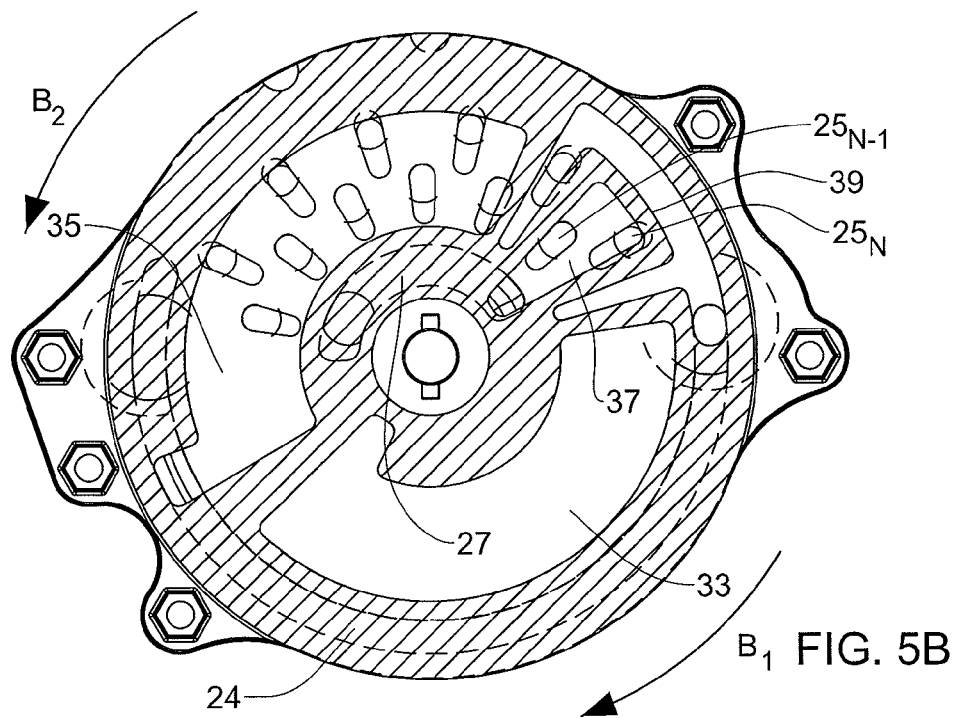

Two predetermined sequences will be now described by way of non-limiting examples only: a built-up sequence (FIGS. 4A to 4C) and a wave sequence (FIGS. 5A and 5B).

Built-Up Sequence: Sequential Inflation—Simultaneous Deflation

The rotor 31 is rotated to a position where the first end 33a of the main inlet channel 33 covers the first individual port $25_1$ and the inlet portion 32 covers the inlet aperture 29 so that a fluid communication between the first individual port $25_1$ and the inlet aperture 29 is created. The air from the air source flows through the inlet aperture 29 to the first individual port $25_1$ and thereby to a first annular cell and starts to inflate it. After reaching a predetermined pressure in the first cell or after a predetermined time of, for example, 2 seconds, the rotor 31 rotates in direction $B_1$ so that the main inlet channel 33 connects the next individual port $25_2$ of the stator to the inlet common port 27, thereby inflating the next second annular cell, as explained above. FIGS. 4A and 4B show the rotor 31 at a position where it covers the individual ports $25_4$ and $25_N$, respectively, thereby inflating the corresponding annular cells. At the end of the inflation process all N individual ports 25 are covered by the main inlet channel 33 and all the annular cells are inflated. After a predetermined time, the rotor continues in a direction $B_1$ or makes turn in direction $B_2$, opposite to the direction $B_1$ so that all N individual ports 25 are covered by the main outlet channel 35 and have a fluid communication with the outlet common port 24 of the stator 21 through the outlet recess 34 of the main outlet channel 35 (FIG. 4C). Thereby, the annular cells are deflated simultaneously and the built-up sequence is completed.

Wave Sequence: Sequential Inflation—Sequential Deflation

The rotor 31 is rotated to a position where the channel 37 covers the individual port $25_1$ and the inlet common port 27 of the stator 21, creating thereby a fluid communication between them and successively inflating the first annular cell, as explained above. Then, the second annular cell is similarly inflated. After reaching a predetermined pressure in the cells or after a predetermined time of, for example, 2 seconds, the rotor 31 rotates in direction $B_1$ and the channel 37 moves to cover the second individual port $25_2$ and the third individual port $25_3$ and connects it to the inlet common port 27 and so on. As shown in FIG. 5A, the rotor covers the individual ports $25_3$ and $25_4$ and connects them to the inlet common port 27. At the same time, the channel 39 connects the individual port $25_2$ to the individual port $25_5$ and allows the air to flow from the individual port $25_2$ to the individual port $25_5$ thereby gradually deflating the second annular cell and inflating the fifth annular cell. When the channel 37 reaches to cover the two last individual ports $25_{N-1}$ and $25_N$, the channel 39 connects the individual port $25_{N-2}$ to the outlet common port 24 of the stator 21 (FIG. 5B) and the corresponding annular cell is deflated. The wave sequence terminates when all the annular cells are deflated.

Instead of the stator 21 and rotor 31, the valve 10 may comprise a stator 61 and a rotor 71 shown FIGS. 6A to 7B.

Figure 6A:
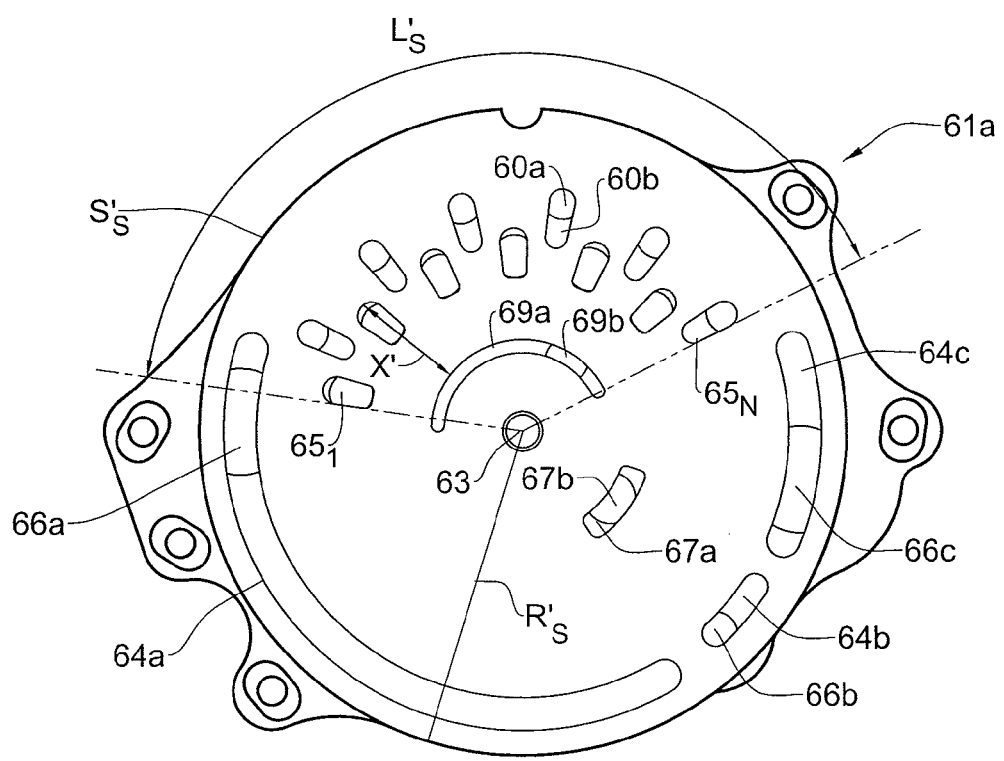
FIGS. 6A and 6B are, respectively, upper and lower views of a stator according to another example of the present invention.
Figure 6B:
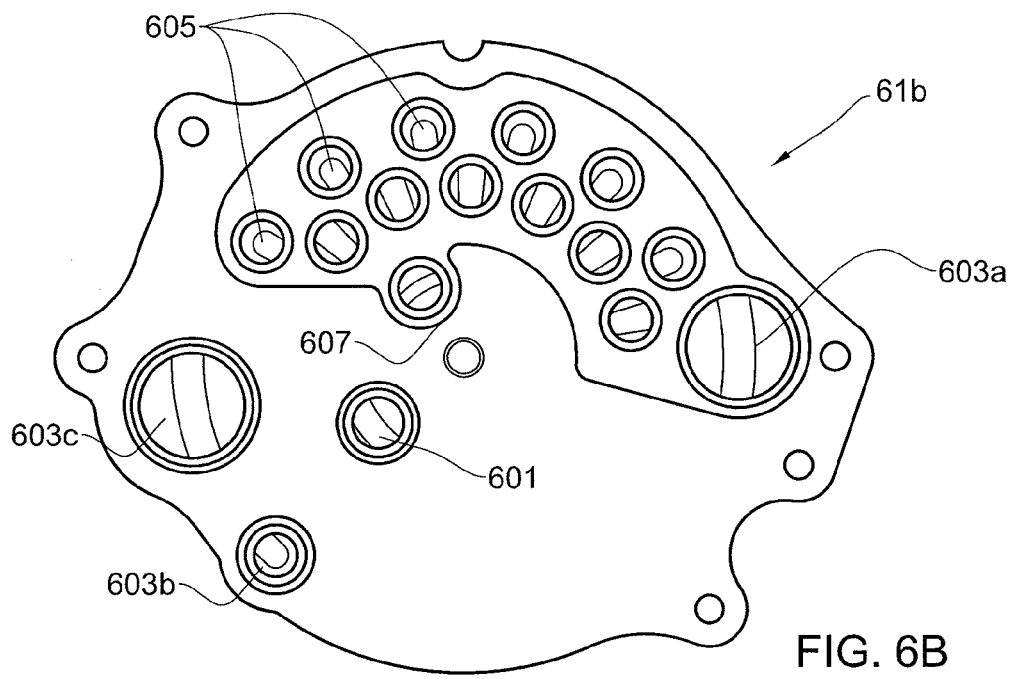

With reference to FIGS. 6A and 6B, the stator disc 61 has a first surface 61a (FIG. 6B) and a second surface 61b (FIGS. 6A, 7B) and a radius $R'_s$. The stator disc 61 is formed with an axial opening 63 for the metal axes 92, and comprises N individual ports 65 arranged within a sector $S'_s$ similarly to the individual ports 25 of the stator 21, a common inlet port 67a having an aperture 67b and a sensor channel 69a with a sensor port 69b. The stator 61 further comprises three outlet common ports 64a, 64b and 64c having outlet apertures 66a, 66b and 66c, respectively. The ports and apertures of the stator 61 function similarly to the ports and apertures of the stator 21, as previously described.

The sector $S'_S$ has a total angular length $L'_s$ measured between a first individual port $25_1$ and a last individual port $25_N$, which is less than 180°. The individual ports 65 are characterized by individual radial distances x' measured therefrom to the sensor channel 69a.

Each individual port 65 has a throughgoing individual port aperture 60a extending between the first and the second surfaces 61a and 61b of the stator disc 61, and a recess 60b formed on the first surface 61a to provide an entrance to the aperture 60a.

As shown in FIG. 6B, the second face 61b of the stator 61 comprises an air inlet 601, which is the opposite end of the aperture 67b, connected to an air source (not shown) and three deflation outlets 603a, 603b and 603c, which are the opposite ends of the outlet apertures 66a, 66b and 66c, connected to an atmosphere in cases where passive deflation is performed or to a vacuum source (not shown) when active deflation is performed. There are also shown the opposite ends 605 of the individual ports 65 and a static pressure sensor 607, which is the opposite end of the sensor port 69b.

Figure 7A:
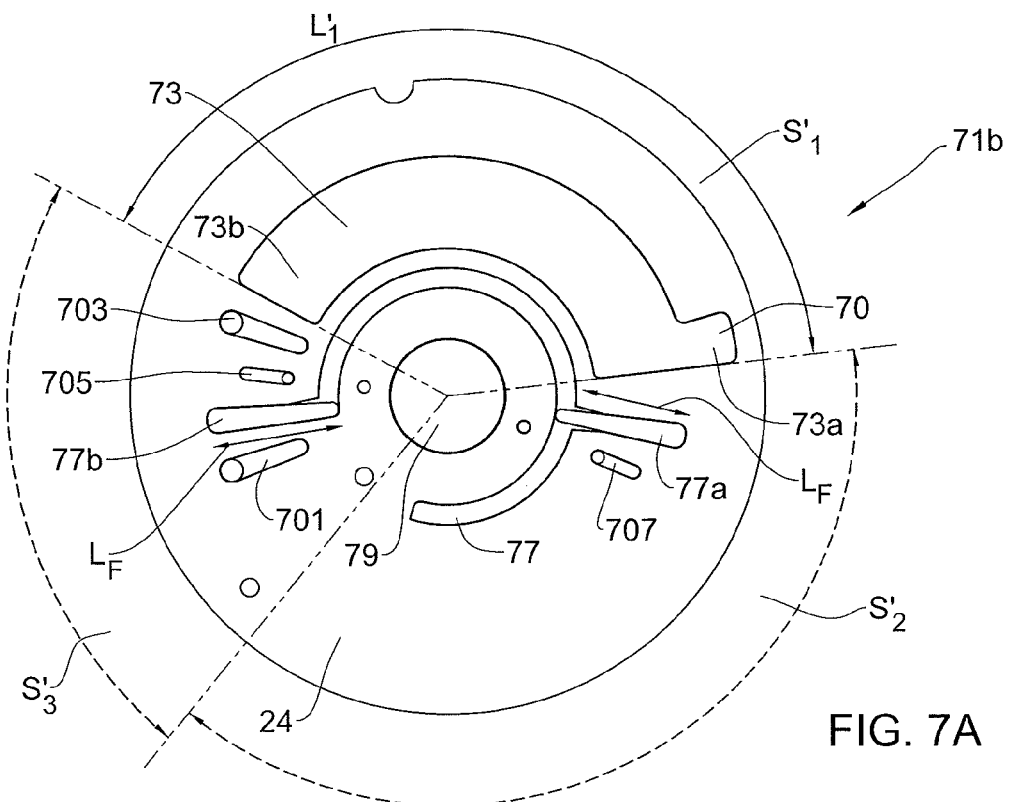
FIG. 7A is a lower view of a rotor according to another example of the present invention.
Figure 7B:
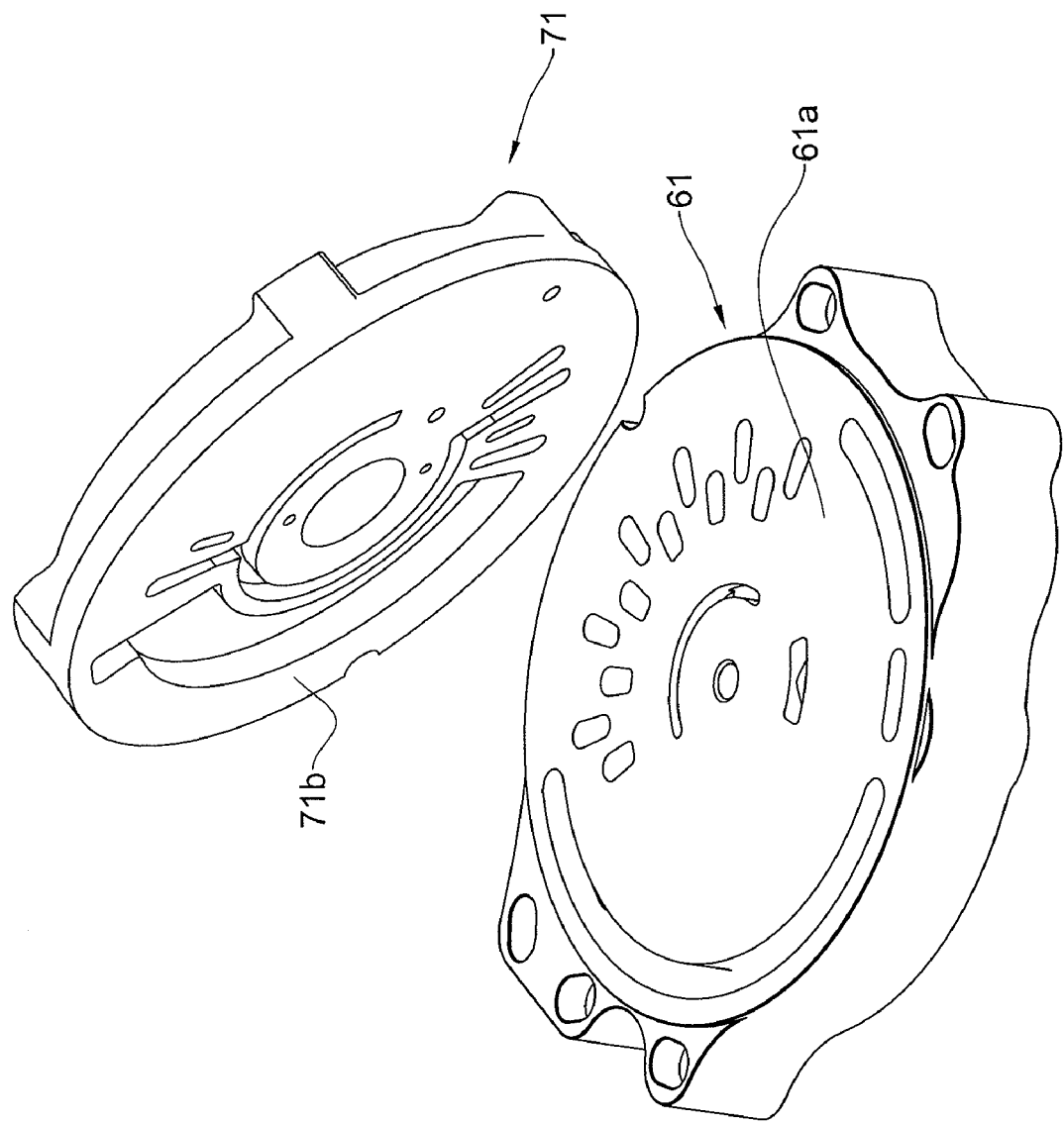
FIG. 7B is an isometric view of the stator and the rotor shown in FIGS. 6A to 7A.

With reference to FIG. 7A the rotor disc 71 first surface 71a (not shown) and a second surface 71b, an axial opening 79 and rotor channels 73 and 77. The channel 73 is an outlet channel having a first end 73a and a second end 73b, defining a first rotor sector $S'_1$ having an angular length $L'_1$. The outlet channel 73 comprises an outlet portion 70 at its first end 73a. The channel 77 is an inlet channel having two side finger shaped portions 77a and 77b (hereinafter: fingers) so that the outlet channel 73 is located therebetween. A radial length $L_F$ of the fingers 77a and 77b is at least equal to the maximal of the individual radial distances x' of the individual ports 65 of the stator 61. The rotor disc 71 further comprises a pre-inflation outlet 701, a pre-inflation inlet 703, a static pressure sensor outlet 705 and a static pressure sensor outlet 707.

A section of the inlet channel 77 containing the first finger 77a defines a second rotor section $S'_2$, and a section containing the second finger 77b, the pre-inflation outlet 701 and the outlets 703 and 705 defines a third rotor section $S'_3$.

The built-up (FIGS. 8A to 8C) and wave (FIGS. 9A and 9B) sequences will now be described as achieved when using the above described stator 61 and rotor 71.

Built-Up Sequence

Figure 8A:
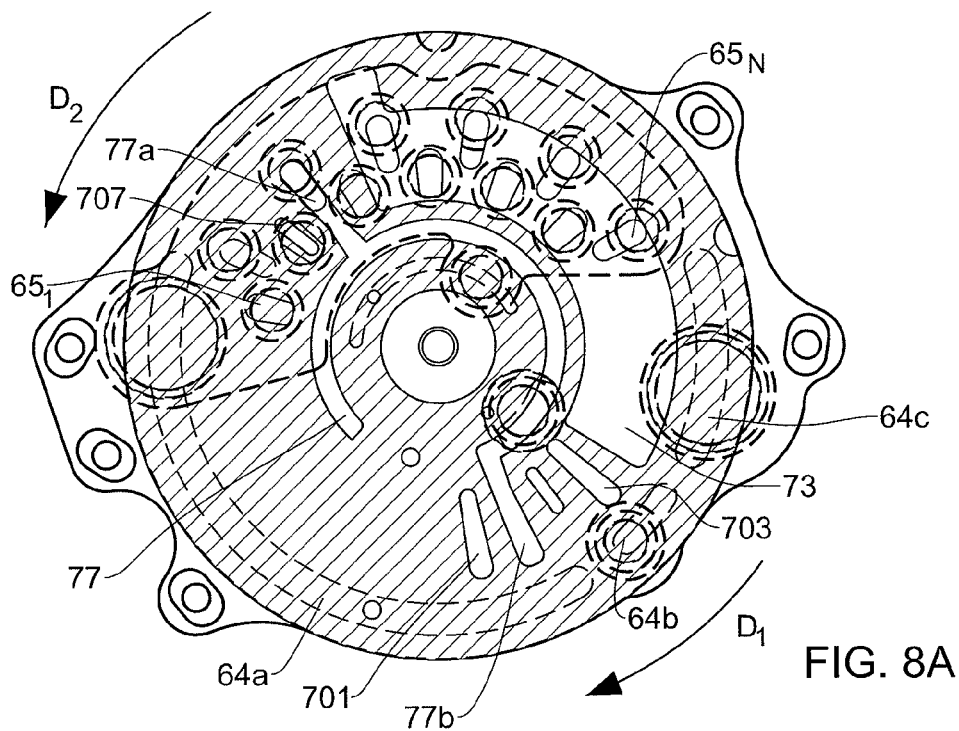
FIGS. 8A to 8C schematically illustrate a build-up sequence performed by the stator and the rotor shown in FIGS. 6A to 7B.
Figure 8B:
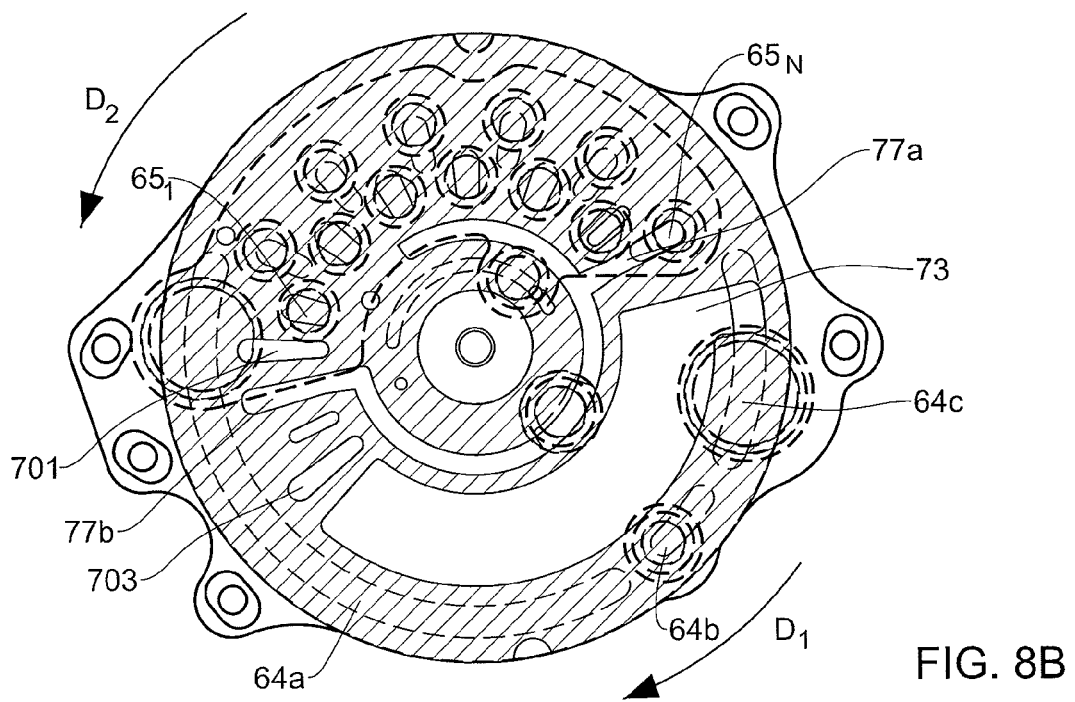
Figure 8C:
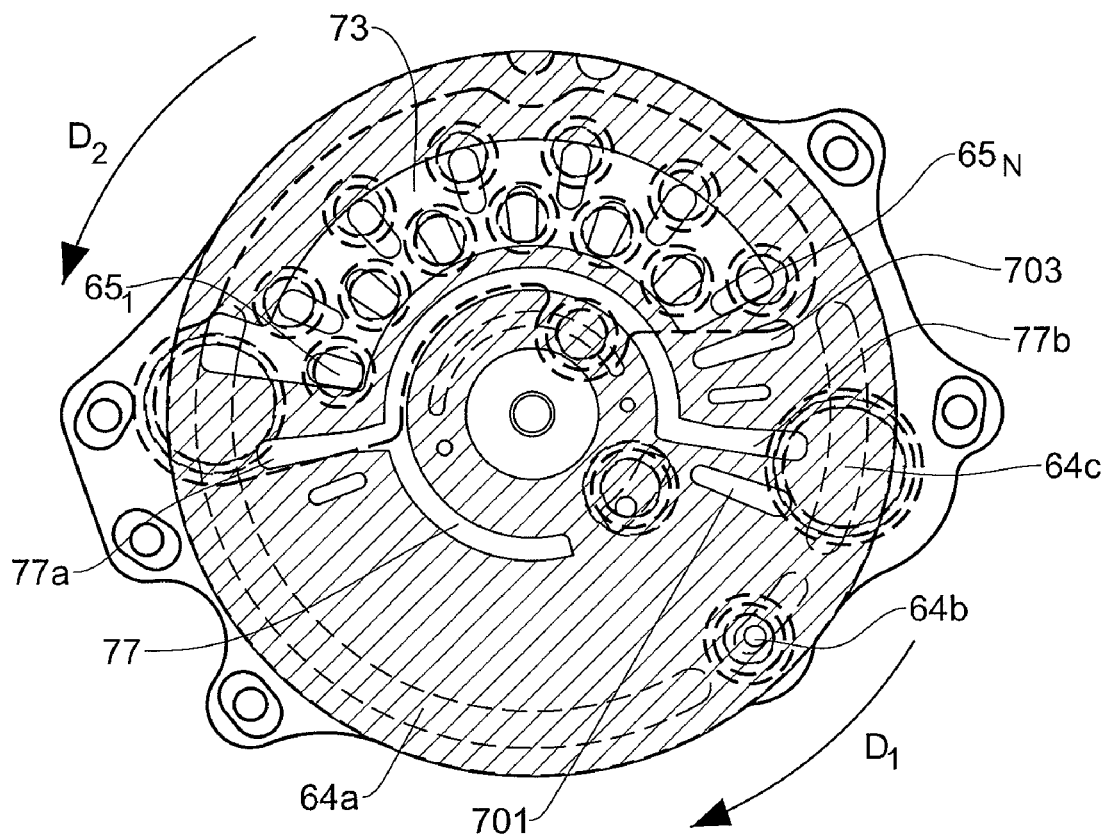

The rotor 71 is rotated to a position where the finger 77a covers the first individual port $65_1$ thereby connecting it to the inlet common port 67a through the channel 77. The air from the air source flows through the inlet aperture 67b to the individual port $65_1$, continues to the first annular cell and inflates it. After reaching a predetermined pressure in the fist annular cell, the rotor 71 rotates in direction $D_1$, so that the finger 77a covers the next individual port. The pressure is measured through the pressure sensor outlet 707, located adjacent to the finger 77a. The outlet 707 is connected to the sensor channel 69a, and consequently to the static pressure sensor 607 on the second face 61b of the stator 61. FIG. 8A shows rotor 71 in a position where it covers the fourth individual port $65_4$, where as the previous ports $65_1$ and $65_2$ were already covered and their corresponding annular cells were inflated. After covering all the ports $65_1$ to $65_{N-1}$ the rotor 71 reaches the last port $65_N$ (FIG. 8B) and after covering it and inflating the last annular cells the inflation process is completed. After a predetermined time, the rotor 71 turns in direction $D_1$ or $D_2$ so that all N individual ports 65 are covered by the outlet channel 73 (FIG. 8C) so that a fluid communication between the ports 65 and the outlet common port 64a is created. All the annular cells are deflated simultaneously and the built-up sequence is then completed.

Wave Sequence

Figure 9A:
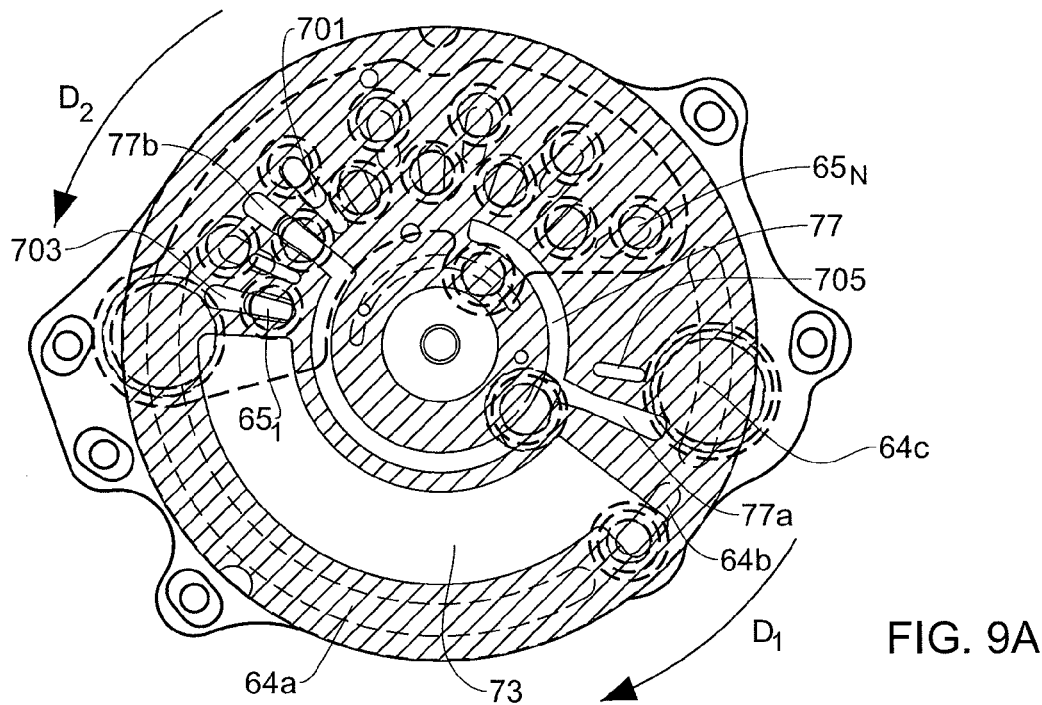
FIGS. 9A and 9B schematically illustrate a wave sequence performed by the stator and the rotor shown in FIGS. 6A to 7B.
Figure 9B:
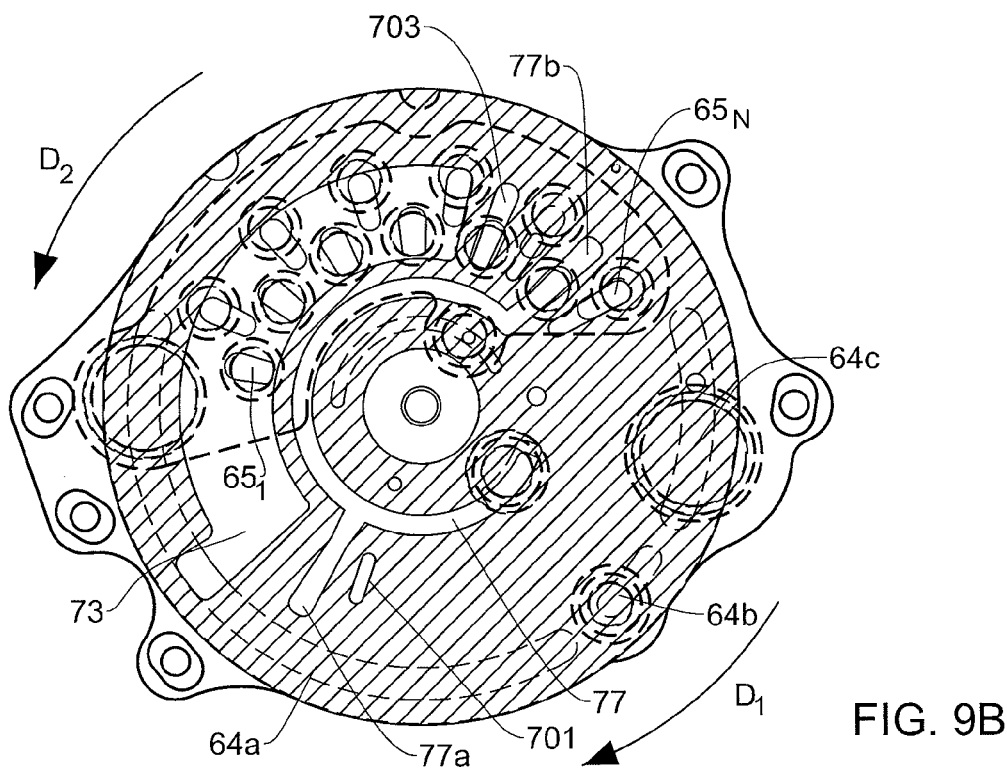

The rotor 71 is rotated to a position where the finger 77b covers the first individual port $65_1$. The fist annular cell is inflated until its pressure reaches a predetermined pressure measured through the pressure sensor outlet 705 located adjacent to the finger 77b, as previously described, and the rotor 71 moves on in direction $D_1$ to the next individual port. FIG. 9A shows the rotor 71 when covering the individual port $65_3$. At the same time, the air flows from the individual port $65_1$ through the pre-inflation outlet 701 to the pre-inflation inlet 703 to the individual port $65_4$, allowing thereby gradually deflating the first annular cell and inflating the forth annular cell (FIG. 9A). When the rotor 71 reaches the individual port $65_4$, the outlet common channel 73 covers the first individual port 651, allowing thereby deflation of the corresponding first annular cell. The rotor 71 moves on so that the finger 77b covers the next port $65_5$ and the outlet common channel covers the next port $65_2$. FIG. 9B shows a position of the rotor 71 in which the finger 77b covers the port $65_{N-1}$, where as all the individual ports $65_1$ to $65_{N-4}$ were already covered by the outlet common channel and their corresponding annular cells were deflated.

The invention claimed is:

1. A multi-port rotary disc valve adapted to allow fluid flow from at least one fluid source to a plurality of destinations in at least two operation modes, said valve comprising:

a stator with fluid flow ports including a plurality of individual ports and at least one common port; each of said individual ports being adapted for fluid communication with at least one of said destinations, and said one common port being adapted for fluid communication with said source; said individual ports being arranged in spaced apart relationship within an individual ports' stator sector having a stator sector angular length; and a rotor having at least a first, a second and a third rotor sector with channels arranged therein, being opened to the atmosphere or adapted to connect the fluid flow ports of the stator between them in a plurality of predetermined combinations, each combination being associated with an angular position of the rotor with respect to the stator during at least partial clock-wise or anti clock-wise turn of the rotor in different predetermined sequences of said combination, said first rotor sector comprising a main outlet connecting channel extending along the entire length thereof and has a first sector angular length at least equal to said stator sector angular length, said second rotor sector comprising an inlet connecting channel for operating in one of said modes, said third rotor sector comprising an inlet connecting channel for operating in the other of said modes, each of the inlet channels having a side portion for connecting between said individual ports of the stator and said inlet channels of the rotor, said side portions being disposed on two sides of said first rotor sector and spaced therefrom.

2. A valve according to claim 1, wherein said stator has at least one common inlet port, said port being located in said stator sector, and at least one common outlet port.

3. A valve according to claim 2, wherein said first rotor sector comprises a main outlet channel and said second rotor sector comprises a main inlet channel, the main outlet and inlet channels extending along the entire length of their corresponding sectors.

4. A valve according to claim 3, wherein said third rotor sector comprises an additional inlet channel and an additional outlet channel, said additional outlet channel extending along the entire length of said third rotor sector.

5. A valve according to claim 4, adapted for operation in a mode in which the individual ports are sequentially provided with fluid communication with said common inlet port of the stator, and subsequently are connected simultaneously to said common outlet port of the stator.

6. A valve according to claim 4, adapted for operation in a mode in which the individual ports are successively provided with fluid communication with said inlet port of the stator, and subsequently are connected successively to other individual ports or to said common outlet port of the stator.

7. A valve according to claim 2, wherein said common inlet port extends along the entire angular length of said stator sector.

8. A valve according to claim 7, wherein said stator has a main common outlet port and at least one additional outlet port.

9. A valve according to claim 8, wherein said third rotor sector comprises a pre-inflation outlet and a pre-inflation inlet, said pre-inflation outlet and inlet being adapted to connect between said individual ports.

10. A valve according to claim 9, adapted for operation in a mode in which said side portion located within said second rotor sector sequentially provides the individual ports with fluid communication with said common inlet port of the stator, and subsequently said main outlet channel simultaneously connects the individual ports to said common outlet port of the stator.

11. A valve according to claim 9, adapted for operation in a mode in which said side portion located within said third rotor sector sequentially provides the individual ports with fluid communication with said common inlet port of the stator, said pre-inflation outlet and inlet provide fluid communication between the individual ports, and subsequently said main outlet channel successively connects the individual ports to said main common outlet port or said additional outlet port.

* * * * *